United States Patent [19]

Yamashita et al.

[11] 4,285,578
[45] Aug. 25, 1981

[54] PHOTO EYEPIECE FOR ENDOSCOPES

[75] Inventors: Nobuo Yamashita, Tama; Miwako Maeda, Hino, both of Japan

[73] Assignee: Olympus Optical Co., Ltd., Tokyo, Japan

[21] Appl. No.: 958,496

[22] Filed: Nov. 7, 1978

[30] Foreign Application Priority Data

Nov. 16, 1977 [JP] Japan .................... 52/138283

[51] Int. Cl.³ .................... G02B 9/34; G02B 25/00
[52] U.S. Cl. .................................................. 350/410
[58] Field of Search ............... 350/175 E, 224, 410, 350/473

[56] References Cited
U.S. PATENT DOCUMENTS 3,823,999 7/1974 Versteeg .................... 350/175 E X

*Primary Examiner*—John K. Corbin
*Assistant Examiner*—Scott J. Sugarman
*Attorney, Agent, or Firm*—Cushman, Darby & Cushman

[57] ABSTRACT

A photo eyepiece for endoscopes comprising at least two cemented lens components, i.e., a first cemented lens component and a second cemented lens component, having a large numerical aperture and, in spite of this merit, corrected very favorably in characteristics of spherical aberration, lateral chromatic aberration and curvature of field.

4 Claims, 4 Drawing Figures

PHOTO EYEPIECE FOR ENDOSCOPES

BACKGROUND OF THE INVENTION (a) Field of the Invention:

The present invention relates to a photo eyepiece for endoscopes which is usable for both observation by naked eyes and photographing with a camera attached on the side of said eyepiece.

(b) Description of the Prior Art:

In observation through an endoscope, diopter is generally adjusted for matching with observer's visual acuity by displacing the eyepiece along the optical axis. For photographing an image transmitted through an image transmitting optical system with a photographic camera attached to the eyepiece, it must always be set at a pre-determined position since it serves as a photographing lens. For this purpose, the eyepiece is displaced toward the rear side until it is set at the pre-determined position for photographing. When a photo eyepiece is used as an eyepiece, an observer is likely to keep his eye rather apart from the eyepiece, and an image formed with a bundle of optical fibers is dark on its circumferential portions since said bundle has such a characteristic as to make light intensity distribution high at the central portion where rays are almost parallel. Therefore, a photo eyepiece must be so designed as to have a large numerical aperture and, at the same time, be free from aggravation of flare due to coma caused by such a large numerical aperture.

Though optical fibers conventionally had large diameters, they have recently been gradually thinned for asuring high image resolution on end surfaces of optical fiber bundles. It is therefore required to assure minimum aberrations over the entire range of an image formed with a photo eyepiece, especially by favorably correcting spherical aberration, lateral chromatic aberration, and further curvature of field so favorably as to obtain a highly flat image. Further, since rays are diversed while transmitting through an image transmitting optical system of an endoscope, an eyepiece therefor must have a numerical aperture several times as large as that of an objective lens. The eyepiece will have a narrow depth of focus accordingly.

Through the defect due to such a narrow depth of focus can be compensated by the adjusting function of observer's eye in observation, said defect poses a problem in photographing and, therefore, curvature of field must be corrected more favorably.

SUMMARY OF THE INVENTION

In view of the foregoing, a general object of the present invention is to provide a photo eyepiece for endoscopes which has a large numerical aperture and in which various aberrations such as spherical aberration, lateral chromatic aberration and curvature of field are favorably corrected.

The photo eyepiece for endoscopes according to the present invention comprises at least two cemented lens components, i.e., a first cemented lens component and a second cemented lens component; said first cemented lens component being arranged on the extreme object side and said second cemented lens component being arranged on the image side as compared with said first cemented lens component; and/or meniscus lens component having negative refractive power which is arranged on the extreme image side. Said meniscus lens component having negative refractive power and arranged on the extreme image side may be said second cemented lens component which is arranged on the extreme image side or an additional meniscus lens component having negative refractive power which is arranged on the image side as compared with said second cemented lens component.

The photo eyepiece according to the present invention is further characterized in that it satisfies the conditions enumerated below:

(1) $\nu_{1p} - \nu_{1n} > \nu_{2p} - \nu_{2n}$
(2) $0.35f < R < 0.55f$ wherein the reference symbols are defined as follows:

$\nu_{1p}$ and $\nu_{1n}$: Abbe's numbers of the positive and negative elements respectively of the first cemented lens component $\nu_{2p}$ and $\nu_{2n}$: Abbe's numbers of the positive and negative elements respectively of the second cemented lens component R: radius of curvature on the surface located on the extreme image side (on the image side surface of the second cemented lens component when it is arranged on the extreme image side or the image side surface of an additional meniscus lens component when it is arranged on the extreme image side)

f: focal length of the photo eyepiece as a whole

In the photo eyepiece according to the present invention, the first cemented lens component is arranged on the extreme object side and the second cemented lens component is arranged on the image side as compared with said first cemented lens component so as to satisfy the condition of $\nu_{1p} - \nu_{1n} > \nu_{2p} - \nu_{2n}$, i.e., in such a way that difference between Abbe's numbers of both the elements of the first cemented lens component is larger than that between Abbe's numbers of both the elements of the second cemented lens component. Both lateral and longitudinal chromatic aberrations are favorably corrected by such a composition. Speaking more concretely, lateral chromatic aberration can be corrected favorably by arranging the first cemented lens component on the extreme object side, however, longitudinal chromatic aberration cannot be corrected sufficiently with said cemented lens component. In order to correct the residual chromatic aberration, the second cemented lens component is provided and both lateral and longitudinal chromatic aberration are favorably corrected at the same time by the fact that interrelation of difference between Abbe's numbers of both the elements of the first cemented lens component relative to that between Abbe's numbers of both the elements of the second lens component is defined as specified in the condition (1). If the interrelation in Abbe's numbers deviates from the range defined by the condition (1), longitudinal chromatic aberration will be overcorrected.

Further, in the photo eyepiece according to the present invention, a meniscus lens component having negative refractive power is arranged on the extreme image side and the surface located on the extreme image side is so designed as to have a radius of curvature within a range of $0.35f < R < 0.55f$. Curvature of field is corrected by arranging this meniscus lens component having negative refractive power on the extreme image side, whereas spherical aberration as well as astigmatism are corrected, and good symmetry of coma is obtained by selecting radius of curvature on the surface located on the extreme image side within the range defined by the condition (2). If the upper limit of the condition (2) is exceeded, spherical aberration will be undercorrected. If the radius of curvature R is smaller than the lower limit defined by the condition (2), in contrast, spherical aberration will be corrected favorably but astigmatism will not be corrected favorably and coma will be made asymmetrical.

Furthermore, the photo eyepiece according to the present invention is so designed as to have a front focal point before the lens system and a rear focal point after the lens system for reserving a long distance to the end surface of the optical fiber bundle and a long distance to the eye point when the photo eyepiece is to be used as an eyepiece.

The photo eyepiece according to the present invention is further characterized in that it additionally satisfies the following conditions which are effective to make it a more preferable photo eyepiece system:

(1) $\nu_{1p} - \nu_{1n} > 25 > \nu_{2p} - \nu_{2n}$
(2) $0.35f < R < 0.55f$
(3) $0.8f < R_1 < 2.5f$
(4) $N_{1n} - N_{1p} > 0.1$
(5) $N_{2p} > N_{2n}$
(6) $1.5f < R_2 < 3.5f$ wherein the reference symbols are defined as follows:

$R_1$ and $R_2$: radii of curvature on the cemented surface of the first and second cemented lens components respectively $N_{1n}$ and $N_{1p}$: refractive indices of the negative and positive elements respectively of the first cemented lens component $N_{2p}$ and $N_{2n}$: refractive indices of the positive and negative elements respectively of the second cemented lens component The condition (1') is defined for correcting lateral chromatic aberration more favorably than the condition (1) already described.

The condition (1') is effective for favorably correcting lateral chromatic aberration while favorably correcting longitudinal chromatic aberration. In a photo eyepiece system for endoscopes, principal rays pass through the first cemented lens component at high portion apart from the optical axis and through the second cemented lens component at low portion relatively near the optical axis. Therefore, the first cemented lens component can correct both the lateral and longitudinal chromatic aberrations simultaneously, whereas the second cemented lens component has a correcting function for longitudinal chromatic aberration only. In this case, lateral chromatic aberration is corrected favorably by selecting a larger difference between Abbe's numbers of both the elements of the first cemented lens component within a range of $\nu_{1p} - \nu_{1n} > 25$. If $\nu_{1p} - \nu_{1n}$ is smaller than 25, it will be impossible to correct lateral chromatic aberration sufficiently. In said case, longitudinal chromatic aberration is undercorrected though it is corrected together with lateral chromatic aberration. Therefore, the difference in Abbe's numbers of both the elements of the second cemented lens component is selected within a range of $\nu_{2p} - \nu_{2n} < 25$ so as to favorably correct residual longitudinal chromatic aberration. If $\nu_{2p} - \nu_{2n}$ exceeds 25, longitudinal chromatic aberration will be overcorrected.

Though the condition (2) remains the same as that already described above, the photo eyepiece according to the present invention can correct spherical aberration, meridional astigmatism and coma more favorably when said photo eyepiece satisfies the conditions (3) and (4) in addition to the condition (2) mentioned above. In the photo eyepiece according to the present invention, spherical aberration is corrected by the functions allotted to both the cemented surface $R_1$ of the first cemented lens component and the surface R which is located on the extreme image side. In case where spherical aberration should be corrected with the cemented surface $R_1$ alone, meridional offaxial spherical aberration will be corrected relatively best for the lower rays, rather pretty for the principal rays and scarcely for the upper rays, thereby producing coma. If spherical aberration is corrected with the surface R alone, in contrast, meridional offaxial spherical aberration will be corrected best for the upper rays, rather pretty for the principal rays and scarcely for the lower rays, thereby producing coma in the direction reverse to that produced when meridional offaxial spherical aberration is corrected with the surface $R_1$ alone. When both the surfaces $R_1$ and R serve for correcting spherical aberration as is the case of the photo eyepiece according to the present invention, however, meridional astigmatism and coma can be corrected favorably while spherical aberration is favorably corrected at the same time. Smaller radii of curvature on the surfaces $R_1$ and R, and larger differences between $N_{1n}$ and $N_{1p}$ will be more effective for correcting spherical aberration. If $R_1$, R or $N_{1n} - N_{1p}$ is larger or smaller than the upper limit of the condition (2) or (3), or the lower limit of the condition (4), spherical aberration will be undercorrected. If $R_1$ or R is smaller than the lower limit of the condition (2) or (3), in contrast, astigmatism will be aggravated and coma will be made asymmetrical though spherical aberration will be corrected favorably.

The condition (5) and (6) are required for correcting curvature of field more favorably with a negative meniscus lens component which is arranged on the extreme image side. Though the photo eyepiece according to the present invention is designed so as to satisfy the conditions (3) and (4) in order to correct spherical aberration more favorably, these conditions define the first cemented lens component consisting of a negative element and a positive element in such a way that said negative element should have a high refractive index and said positive element should have a low refractive index, thereby aggravating curvature of field. For preventing curvature of field from being aggravated, the second cemented lens component is so designed as to comprise a positive element having a high refractive index and a negative element having a low refractive index as defined by the conditions (5), reversely to the elements of the first cemented lens component in the photo eyepiece according to the present invention. Further, refractive powers of the positive and negative elements of the second cemented element are kept at high levels on the orders of 2f and $-f$ as in the conditions (5) and (6) respectively for favorably correcting curvature of field. If the refractive power of the positive or negative element is lower than the lower limit of the condition (5) or (6), it will be impossible to correct curvature of field so favorably as required for a photo eyepiece. If the upper limit of the condition (6) is exceeded, in contrast, spherical aberration will be remarkably aggravated though curvature of field will be corrected favorably.

DESCRIPTION OF THE PREFERRED EMBODIMENTS

Figure 1:
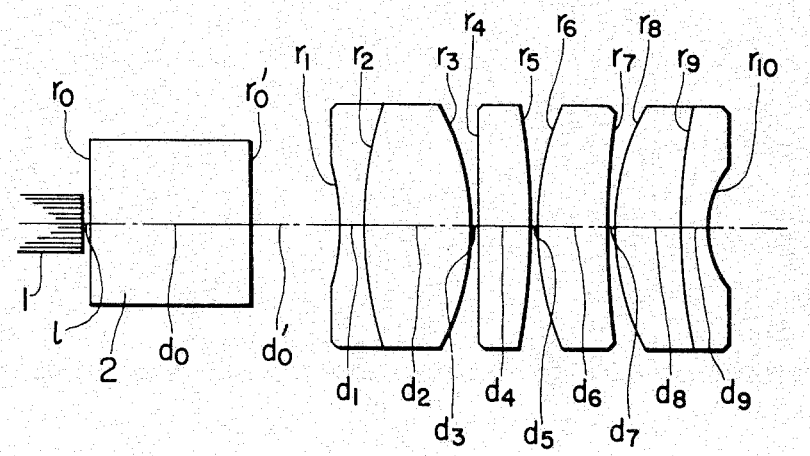
FIG. 1 shows a sectional view illustrating the composition of an embodiment of the photo eyepiece according to the present invention.
Figure 3:
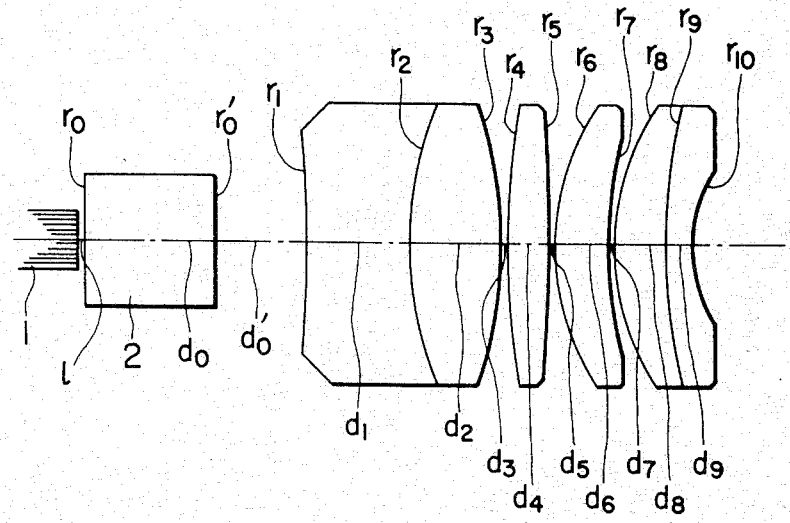
FIG. 3 shows a sectional view illustrating the composition of another embodiment of the present invention.

FIG. 1 and FIG. 3 illustrates some preferred embodiments of the photo eyepiece according to the present invention which comprises a first cemented lens component arranged on the extreme object side, two lens components each consisting of a single positive element and a second cemented lens component, said photo eyepiece system having the following numerical data:

| Embodiment 1 | | | |
|---|---|---|---|
| $f = 1.0$ | | | |
| $r_0 = \infty$ | | | |
| | $d_0 = 0.652$ | $n_0 = 1.51633$ | $\nu_0 = 64.15$ |
| $r_0' = \infty$ | | | |
| | $d_0' = 0.368$ | | |
| $r_1 = -1.0522$ | | | |
| | $d_1 = 0.108$ | $n_1 = 1.78472$ | $\nu_1 = 25.71$ |
| $r_2 = 1.7816$ | | | |
| | $d_2 = 0.434$ | $n_2 = 1.53113$ | $\nu_2 = 62.44$ |
| $r_3 = -0.8659$ | | | |
| | $d_3 = 0.024$ | | |
| $r_4 = \infty$ | | | |
| | $d_4 = 0.217$ | $n_3 = 1.71300$ | $\nu_3 = 53.89$ |
| $r_5 = 2.2460$ | | | |
| | $d_5 = 0.024$ | | |
| $r_6 = 1.1113$ | | | |
| | $d_6 = 0.287$ | $n_4 = 1.71300$ | $\nu_4 = 53.89$ |
| $r_7 = 3.9609$ | | | |
| | $d_7 = 0.024$ | | |
| $r_8 = 0.8587$ | | | |
| | $d_8 = 0.275$ | $n_5 = 1.71300$ | $\nu_5 = 53.89$ |
| $r_9 = 2.7982$ | | | |
| | $d_9 = 0.119$ | $n_6 = 1.59270$ | $\nu_6 = 35.29$ |
| $r_{10} = 0.4687$ | | | |
| | N.A. $= 0.225$ | | $2\omega = 6°$ |

Photographing magnification: 7.5×

| Embodiment 2 | | | |
|---|---|---|---|
| $f = 1.0$ | | | |
| $r_0 = \infty$ | | | |
| | $d_0 = 0.440$ | $n_0 = 1.51633$ | $\nu_0 = 64.15$ |
| $r_0' = \infty$ | | | |
| | $d_0' = 0.719$ | | |
| $r_1 = -4.7024$ | | | |
| | $d_1 = 0.341$ | $n_1 = 1.78472$ | $\nu_1 = 25.71$ |
| $r_2 = 1.2123$ | | | |
| | $d_2 = 0.302$ | $n_2 = 1.64000$ | $\nu_2 = 60.09$ |
| $r_3 = -1.4684$ | | | |
| | $d_3 = 0.016$ | | |
| $r_4 = 2.8125$ | | | |
| | $d_4 = 0.146$ | $n_3 = 1.71300$ | $\nu_3 = 53.89$ |
| $r_5 = -5.3611$ | | | |
| | $d_5 = 0.016$ | | |
| $r_6 = 0.8105$ | | | |
| | $d_6 = 0.188$ | $n_4 = 1.71300$ | $\nu_4 = 53.89$ |
| $r_7 = 1.5196$ | | | |
| | $d_7 = 0.016$ | | |
| $r_8 = 0.8504$ | | | |
| | $d_8 = 0.174$ | $n_5 = 1.72600$ | $\nu_5 = 53.56$ |
| $r_9 = 2.0343$ | | | |
| | $d_9 = 0.080$ | $n_6 = 1.58267$ | $\nu_6 = 46.33$ |
| $r_{10} = 0.4323$ | | | |
| | N.A. $= 0.225$ | | $2\omega = 5.6°$ |

Photographing magnification: 5× wherein the reference symbols $r_1$ through $r_{10}$ represent radii of curvature on the surfaces of the respective lens elements, the reference symbols $d_1$ through $d_9$ designate thicknesses of the respective lens elements, the reference symbols $n_1$ through $n_6$ denote refractive indices of the respective lens elements and the reference symbols $\nu_1$ through $\nu_6$ represent Abbe's numbers of the respective lens elements.

Figure 2:
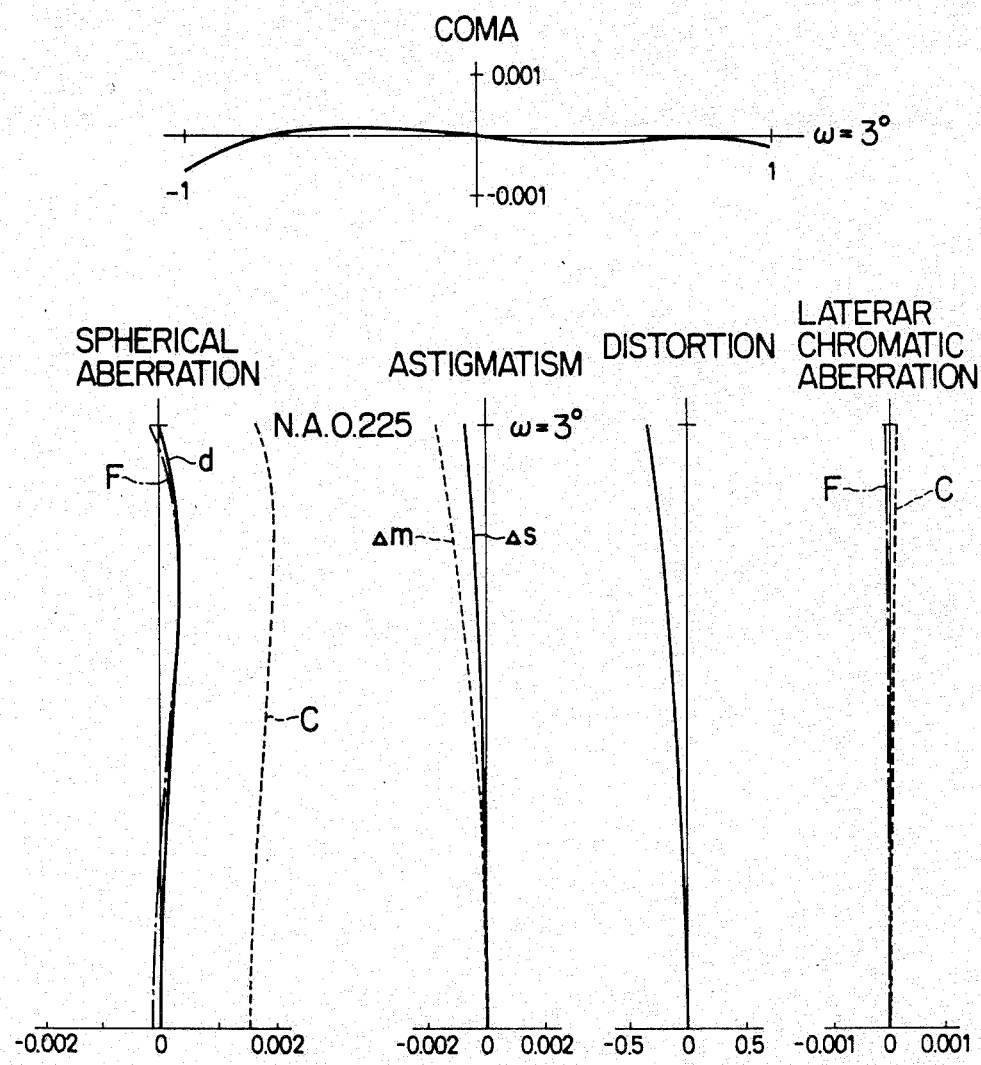
FIG. 2 shows graphs illustrating the aberration characteristics of the Embodiment 1.
Figure 4:
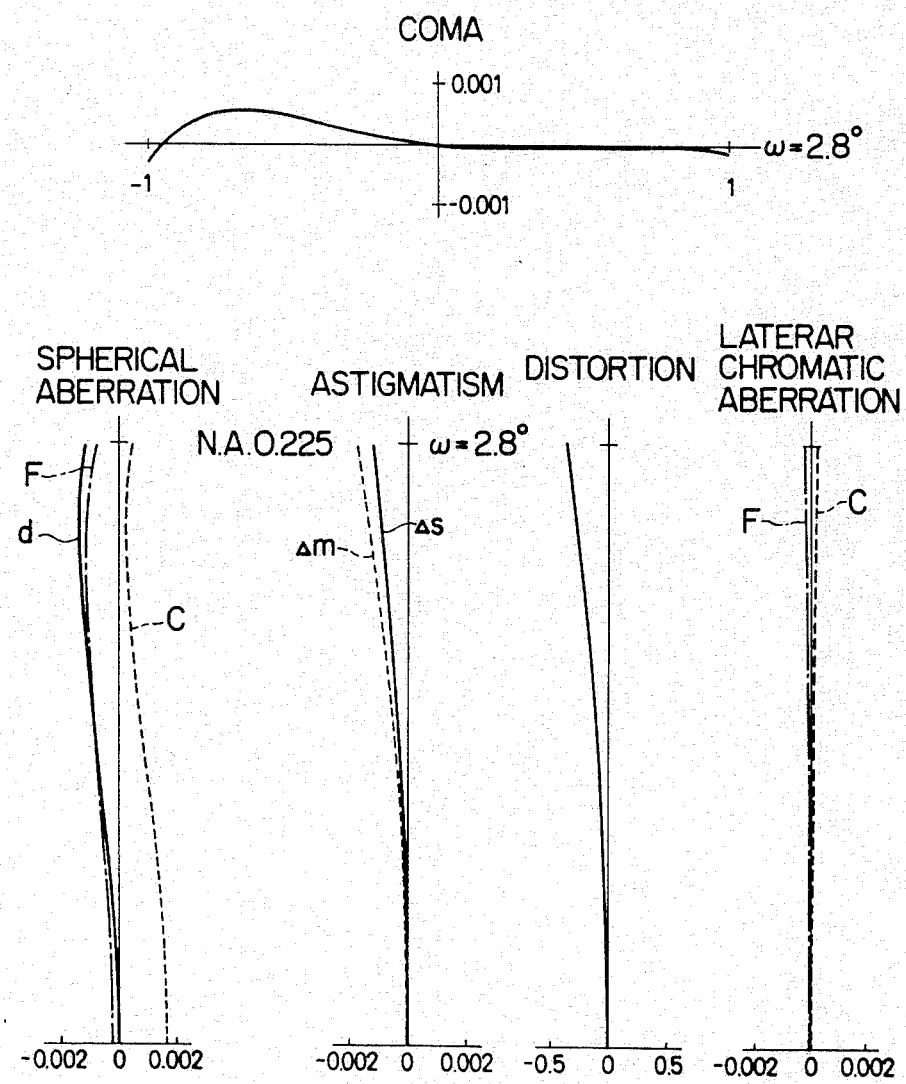
FIG. 4 shows graphs illustrating the aberration characteristics of the Embodiment 2.

The embodiments comprise a prism 2 which is arranged between an optical fiber bundle 1 and the photo eyepiece as illustrated in the drawings. In the numerical data specified for the embodiments, the reference symbols $r_0$ and $r_0'$ therefore represent radii of curvature on both the surfaces of said prism, the reference symbols $d_0$ and $d_0'$ designate thickness of said prism and airspace formed between said prism and the first lens component, and the reference symbol 1 denotes distance as measured from said optical fiber bundle to said prism. The curves shown in FIG. 2 and FIG. 4 visualize aberration characteristics of the Embodiments as including those of said prism. Further, the reference symbols R, $R_1$ and $R_2$ used in the conditions correspond to $r_{10}$, $r_2$ and $r_9$ respectively used in the numerical data, the reference symbols $N_{1p}$, $N_{1n}$, $N_{2p}$ and $N_{2n}$ correspond to $n_2$, $n_1$, $n_5$ and $n_6$ respectively and the reference symbols $\nu_{1p}$, $\nu_{1n}$, $\nu_{2p}$ and $\nu_{2n}$ correspond to $\nu_2$, $\nu_3$, $\nu_5$ and $\nu_6$ respectively. Furthermore, the above-mentioned numerical data are specified as those for the photo eyepiece when it is set for photographing condition. When said photo eyepiece is to be used as an eyepiece, the lens system is displaced toward the prism 2 and the reference symbol $d_0'$ therefore has a value smaller than that defined in the numerical data. As is clear from the foregoing descriptions and the aberration characteristics shown in the forms of curves in the accompanying drawings, the lens system according to the present invention can compose photo eyepiece for endoscopes which has a large numerical aperture and, in spite of this merit, in which various aberrations such as spherical aberration, lateral chromatic aberration and curvature of field are favorably corrected.

We claim:
1. A photo eyepiece for endoscopes comprising a positive cemented meniscus lens component having a concave surface on the object side, a positive lens component, a positive meniscus lens component having a convex surface on the object side and a negative cemented meniscus lens component having a convex surface on the object side, and said photo eyepiece system satisfying the following conditions:
   (1) $\nu_{1p} - \nu_{1n} > \nu_{2p} - \nu_{2n}$
   (2) $0.43f < R < 0.47f$ wherein the reference symbols $\nu_{1p}$ and $\nu_{1n}$ represent Abbe's numbers of the positive and negative elements respectively of said positive cemented meniscus lens component, the reference symbols $\nu_{2p}$ and $\nu_{2n}$ designate Abbe's numbers of the positive and negative elements respectively of said negative cemented meniscus lens component, the reference symbol R denotes radius of curvature on the surface located on the extreme image side and the reference symbol f represents focal length of the photo eyepiece system as a whole.

2. A photo eyepiece for endoscopes according to claim 1 satisfying the following conditions (3) through (6):

(3) $1.2f < R_1 < 1.8f$
(4) $0.26 < N_{1n} - N_{1p} > 0.14$
(5) $N_{2p} > N_{2n}$
(6) $2.0f < R_2 < 2.8f$ wherein the reference symbol $R_1$ denotes radius of curvature on the cemented surface of said positive cemented meniscus lens component, the reference symbol $R_2$ designates radius of curvature of the cemented surface of said negative cemented meniscus lens component, the reference symbols $N_{1p}$ and $N_{1n}$ denote refractive indices of the positive and negative elements respectively of said positive cemented meniscus lens component, and the reference symbols $N_{2p}$ and $N_{2n}$ represent refractive indices of the positive and negative elements respectively of said negative cemented meniscus lens component.

3. A photo eyepiece for endoscopes according to claim 2 having the following numerical data:

| | [f = 1.0] | | |
|---|---|---|---|
| $r_1 = -1.0522$ | | | |
| | $d_1 = 0.108$ | $n_1 = 1.78472$ | $\nu_1 = 25.71$ |
| $r_2 = [-] 1.7816$ | | | |
| | $d_2 = 0.434$ | $n_2 = 1.53113$ | $\nu_2 = 62.44$ |
| $r_3 = -0.8659$ | | | |
| | $d_3 = 0.024$ | | |
| $r_4 = \infty$ | | | |
| | $d_4 = 0.217$ | $n_3 = 1.71300$ | $\nu_3 = 53.89$ |
| $r_5 = -2.2460$ | | | |
| | $d_5 = 0.024$ | | |
| $r_6 = [-] 1.1113$ | | | |
| | $d_6 = 0.287$ | $n_4 = 1.71300$ | $\nu_4 = 53.89$ |
| $r_7 = [-] 3.9609$ | | | |
| | $d_7 = 0.024$ | | |
| $r_8 = [-] 0.8587$ | | | |
| | $d_8 = 0.275$ | $n_5 = 1.71300$ | $\nu_5 = 53.89$ |
| $r_9 = [-] 2.7982$ | | | |
| | $d_9 = 0.119$ | $n_6 = 1.59270$ | $\nu_6 = 35.29$ |

-continued

| | | | |
|---|---|---|---|
| $r_{10} = [-] 0.4687$ | | | |
| | $f = 1.0$ | N.A. = 0.225 | $2\omega = 6°$ |

[Photographing] Photographing magnification: 7.5× wherein the reference symbols $r_1$ through $r_{10}$ represent radii of curvature on the surfaces of the respective lens elements, the reference symbols $d_1$ through $d_9$ designate thicknesses of the respective lens elements and airspaces therebetween, the reference symbols $n_1$ through $n_6$ denote refractive indices of the respective lens elements and the reference symbols $\nu_1$ through $\nu_6$ represent Abbe's numbers of the respective lens elements.

4. A photo eyepiece for endoscopes according to claim 2 having the following numerical data:

| | | | |
|---|---|---|---|
| $r_1 = -4.7024$ | | | |
| | $d_1 = 0.341$ | $n_1 = 1.78472$ | $\nu_1 = 25.71$ |
| $r_2 = [-] 1.2123$ | | | |
| | $d_2 = 0.302$ | $n_2 = 1.64000$ | $\nu_2 = 60.09$ |
| $r_3 = -1.4684$ | | | |
| | $d_3 = 0.016$ | | |
| $r_4 = [-] 2.8125$ | | | |
| | $d_4 = 0.146$ | $n_3 = 1.71300$ | $\nu_3 = 53.89$ |
| $r_5 = -5.3611$ | | | |
| | $d_5 = 0.016$ | | |
| $r_6 = [-] 0.8105$ | | | |
| | $d_6 = 0.188$ | $n_4 = 1.71300$ | $\nu_4 = 53.89$ |
| $r_7 = [-] 1.5196$ | | | |
| | $d_7 = 0.016$ | | |
| $r_8 = [-] 0.8504$ | | | |
| | $d_8 = 0.174$ | $n_5 = 1.72600$ | $\nu_5 = 53.56$ |
| $r_9 = [-] 2.0343$ | | | |
| | $d_9 = 0.080$ | $n_6 = 1.58267$ | $\nu_6 = 46.33$ |
| $r_{10} = [-] 0.4323$ | | | |
| | $f = 1.0$ | N.A. = 0.225 | $2\omega = 5.6°$ |

Photographing magnification: 5× wherein the reference symbols $r_1$ through $r_{10}$ represent radii of curvature on the surfaces of the respective lens elements, the reference symbols $d_1$ through $d_9$ designate thicknesses of the respective lens elements and airspaces therebetween, the reference symbols $n_1$ through $n_6$ denote refractive indices of the respective lens elements and the reference symbols $\nu_1$ through $\nu_6$ represent Abbe's numbers of the respective lens elements.

* * * * *